United States Patent [19]
Sortwell

[11] Patent Number: 4,603,156
[45] Date of Patent: * Jul. 29, 1986

[54] METHOD OF DISPERSING DRY, WATER-SOLUBLE POLYMERS IN WATER

[75] Inventor: Edwin T. Sortwell, Wheaton, Ill.

[73] Assignee: Diatec Polymers, Batavia, Ill.

[*] Notice: The portion of the term of this patent subsequent to Jul. 16, 2002 has been disclaimed.

[21] Appl. No.: 588,793

[22] Filed: Mar. 12, 1984

[51] Int. Cl.$^4$ .............................. C08J 3/06; C08F 6/00
[52] U.S. Cl. ..................................... 523/324; 528/499; 528/502
[58] Field of Search ............... 366/241, 102; 523/319, 523/324, 330; 528/499, 502

[56] References Cited

U.S. PATENT DOCUMENTS

| | | | |
|---|---|---|---|
| Re. 28,474 | 7/1974 | Anderson et al. | 523/336 |
| Re. 28,576 | 10/1975 | Anderson et al. | 523/336 |
| 3,541,062 | 11/1970 | Van Dierendonck | 260/80.78 |
| 3,852,191 | 12/1974 | Zucker et al. | 210/71 |
| 4,113,688 | 9/1978 | Pearson | 523/324 |
| 4,402,615 | 9/1983 | Mayer | 366/102 X |
| 4,499,214 | 2/1985 | Sortwell | 523/336 |
| 4,529,794 | 7/1985 | Sortwell et al. | 528/502 X |

FOREIGN PATENT DOCUMENTS

| | | | |
|---|---|---|---|
| 1753783 | 2/1984 | Australia | 528/502 |
| 542866 | 3/1985 | Australia | 528/502 |
| 512092 | 8/1939 | United Kingdom | 528/499 |

OTHER PUBLICATIONS

"Chemical Engineers' Handbook" J. H. Perry (ed.), McGraw-Hill Co., Inc., N.Y. (1950), pp. 1103, 1114.
Comitrol ® Catalog-Urschel Laboratories, Inc.-Bulletin No. 921, Sep., 1982.

Primary Examiner—Joseph L. Schofer
Assistant Examiner—F. M. Teskin
Attorney, Agent, or Firm—Wood, Dalton, Phillips Mason & Rowe

[57] ABSTRACT

A method and apparatus for rapidly dispersing particles of dry, water soluble polymer into water wherein air, water and said polymer particles are introduced to a chamber for thorough contact of the polymer with the water to form a mixture of aqueous polymer dispersion and entrained air. The mixture is immediately subjected to shear forces to separate any agglomerated particles into individual particles, and to prevent further agglomeration.

37 Claims, 7 Drawing Figures

METHOD OF DISPERSING DRY, WATER-SOLUBLE POLYMERS IN WATER

BACKGROUND OF THE INVENTION

1. Field of the Invention

This invention relates generally to the dispersion of polymers into water and, more particularly, this invention relates to a method and apparatus for rapidly dispersing dry, water soluble polymer particles into water.

2. Description of the Prior Art

The use of solutions of water soluble polymers in thickening and flocculating applications is well known. Such applications include the clarification of aqueous solutions in papermaking, and in treatment of sewage and industrial wastes. Such solutions of polymers are also useful as stabilizers for drilling muds, and in the secondary recovery of petroleum by water flooding.

Although these polymers are most often available commercially as powders or as finely divided solids, they are most frequently utilized in aqueous solutions. This necessitates that the solid polymer material be dissolved in water. Although the various polymers are more or less soluble in water, difficulty is often experienced in preparing aqueous polymer solutions because of their slow dissolution and because the solid polymer is not readily dispersible in water.

Furthermore, dispersion of solid polymers in water is hindered by the tendency of polymer particles to clump or remain as agglomerates on contact with water. Lumps of solid polymer immediately form after limited wetting with water by the encapsulation of undissolved solids in an outer coating of water-wet polymer which retards the penetration of additional water into the agglomerate. Although many of these lumps are eventually dissolved by continued agitation, it is frequently impractical to agitate the solution for a sufficiently long period to obtain complete dissolution. Long mixing times, of course, are uneconomical and may damage polymer molecular weight through exposure of the polymer to excessive hydraulic and mechanical shear.

The problem is compounded by the fact that dry polymer particles usually include very fine, dustlike particles. This creates pollution problems in the vicinity of the equipment and can aggravate the problem of buildup of sticky or slippery polymer on equipment surfaces.

The foregoing problems are described in numerous prior publications, including U.S. Pat. Nos. Re. 28,474 (July 8, 1974) and Re. 28,576 (Oct. 21, 1975) issued to Anderson et al.

The above-identified Anderson et al reissue patents exemplify prior approaches to overcoming the problem of rapidly dissolving polymers in the water. In the Anderson et al disclosures, water soluble polymer is dispersed into a water-in-oil emulsion, which emulsion is then inverted in water to release the polymer into solution.

The method of the Anderson et al disclosures is limited in terms of the polymer content of the emulsion. Further, such systems, in practice, require substantial amounts of an emulsifier to provide a stable product and, of course, require the use of an oil phase, which creates handling and economic problems.

SUMMARY OF THE INVENTION

It is an object of the invention to overcome one or more of the problems described above.

According to the present invention, dry, particulate water soluble polymers or gums, or mixtures thereof, are rapidly dispersed in water by a method which comprises the steps of contacting the dry polymer particles with water and a large volume of air (as compared to the volume of the polymer) in a chamber such that the polymer is thoroughly wetted. Contact of dry particles with equipment surfaces which are not thoroughly wetted is avoided.

The resulting mixture of polymer particles, water and entrained air is immediately subjected to instantaneous and momentary shear whereby any agglomerates of particles are divided into individual particles, without molecular degradation or reduction of particle size, and further agglomeration is prevented. This step provides a dispersion of polymer in water, mixed with entrained air. This dispersion/air mixture is then discharged for separation of the air from the dispersion and the dispersion is transferred to a user's holding tank or mixer.

The invention also contemplates an apparatus for carrying out the inventive method.

By means of the invention, a concentrated dispersion of polymer in water is rapidly obtained without agglomeration of particles, dusting of polymer into the immediate environment of the equipment, or buildup of sticky or slippery polymer on equipment surfaces. Dust is educted into the water/air mixture. The need for an inversion process is eliminated.

The dispersion can be transferred to tanks for storage or, alternatively, for mixing wherein the dispersion is mixed until a desired degree of gelation is obtained, whereupon the partially solublized dispersion may be transferred to bags or tanks for further hydration to complete dissolution.

Further objects and advantages of the invention will be apparent to those skilled in the art from the following detailed description, taken in conjunction with the drawings and the appended claims.

DETAILED DESCRIPTION OF THE INVENTION

The Water Soluble Polymers

The polymers which may be dispersed according to the invention are well known in the art and have been described in numerous publications and patents. They include, but are not limited to, naturally occurring galactomannan gums such as guar and locust bean gums, alginate salts, biologically produced polymers (e.g. Xanthan gum), polyethylene oxides, water soluble condensation polymers, and vinyl addition polymers such as polyacrylamides and copolymeric derivatives of acrylamide with, for example, acrylic acid, maleic anhydride, acrylonitrile, styrene, allyl or diallyl amines or dimethylaminoethylmethacrylate (DMAEM). Such polymers may be nonionic, anionic or cationic.

The gums are well-known water-soluble polymers, and include those described in Volume 10 of the Encyclopedia of Chemical Technology, 2nd Edition, Interscience Publishers, 1966, the disclosure of which is incorporated herein by reference.

The molecular weight of the polymers may vary over a wide range, e.g. between about 10,000 and 25,000,000 and molecular weight is not a critical parameter in this invention. The invention is particularly useful with respect to acrylamide polymers, the molecular weights of which are generally in excess of 1 million.

As used herein, the term "polymer" is understood to include polymers and gums which are soluble in water to a significant degree. The polymers are solid, but may have a substantial water content.

The Comminution Process

The dispersions obtained with the invention will most commonly be used to obtain aqueous solutions of polymer, as by dilution and additional mixing.

The rate of polymer dispersion and dissolution in water is a function of surface area and, consequently, particle size. Polymers produced by most manufacturing processes are in the form of powders or lump-like agglomerates. Large particle sizes minimize handling and dusting problems and reduce the formation of gel particles during dissolution in water. However, large particle size increases dissolving time when dry particles are added directly to water.

Therefore, it is desirable that the particles be comminuted before dispersion, as by grinding, abrading or slicing so as to develop the large surface area which promotes rapid dispersion and dissolution. The preferred particle size of the polymer or gum is determined by the desired improvement in dispersion rate in water and will generally be less than about ⅛" in diameter and may include fine particles of less than 200 mesh (Tyler). Small particle size promotes dispersion stability.

The Dispersion Method and Apparatus

Referring now to the Figures, the method of the invention and a preferred embodiment of apparatus for carrying out the method will be described.

Figure 1:
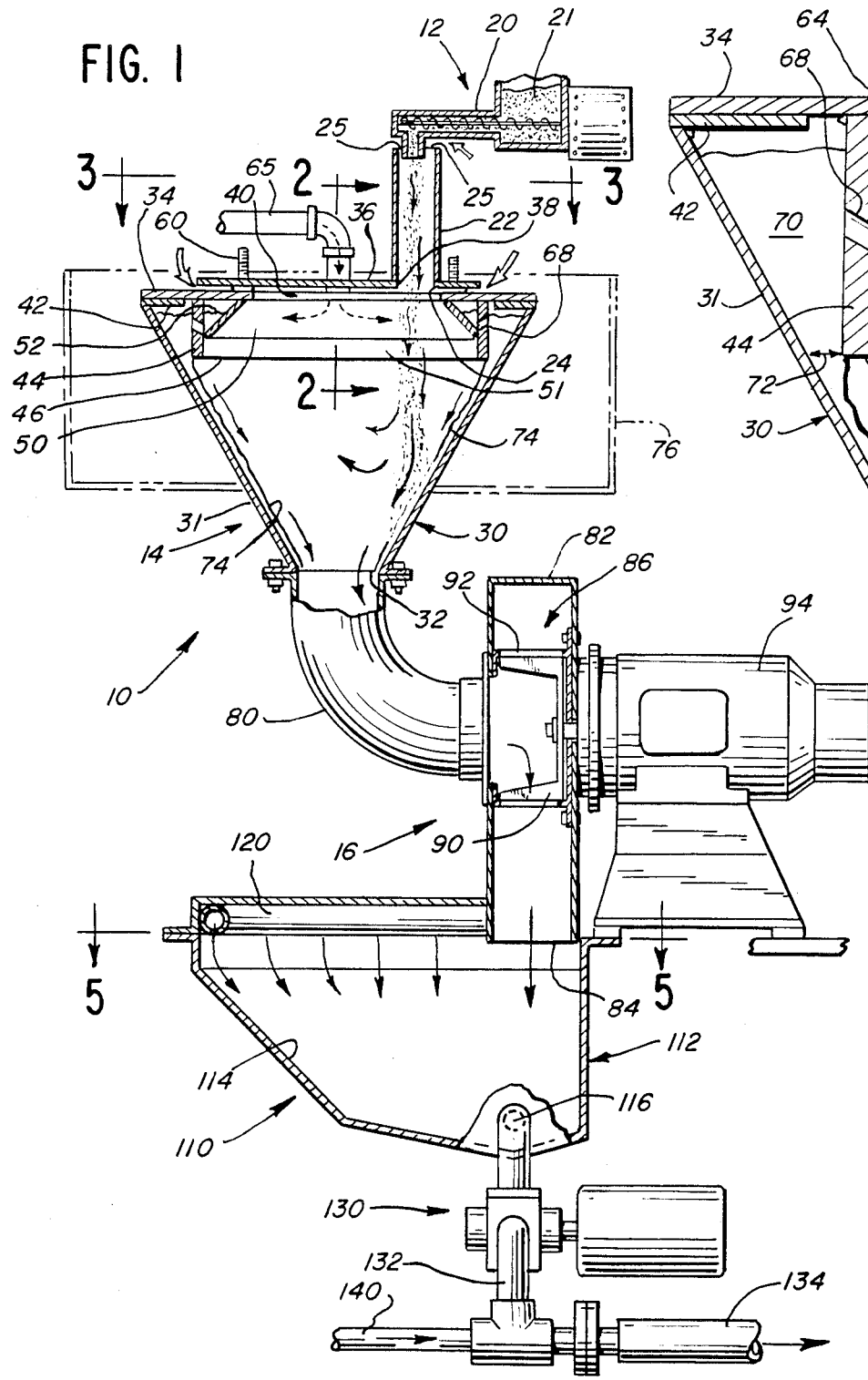
FIG. 1 is a fragmentary elevation, partially in section, of one embodiment of an apparatus for carrying out the method of the invention.
Figure 3:
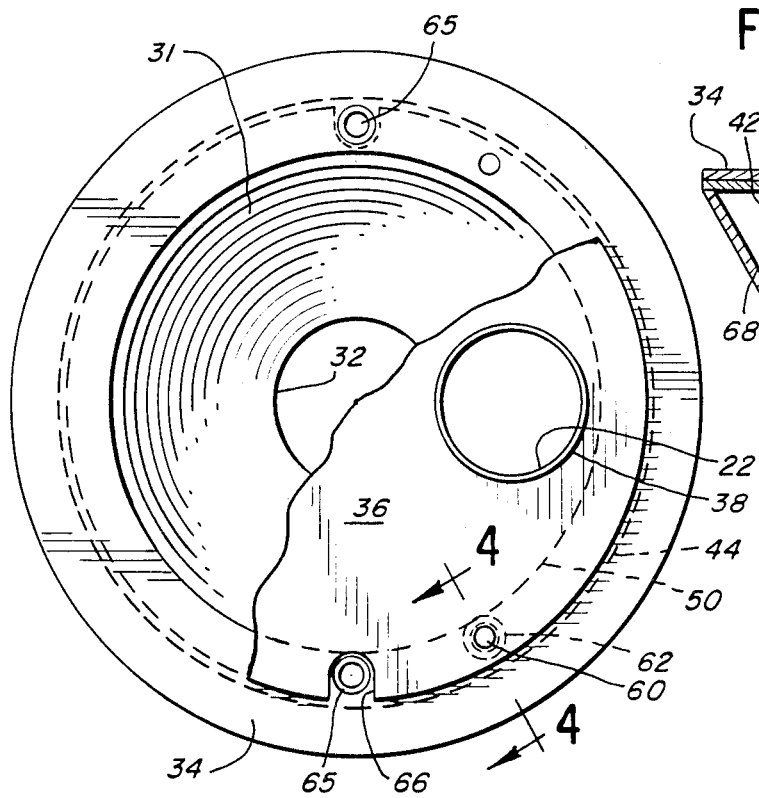
FIG. 3 is an overhead fragmentary plan view, partially in section, of the apparatus of FIG. 1, taken generally along line 3—3 thereof.
Figure 4:
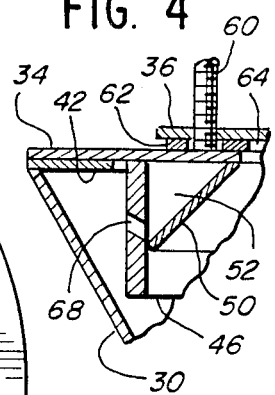
FIG. 4 is a fragmentary sectional view of the apparatus of FIG. 3, taken generally along line 4—4 thereof.
Figure 5:
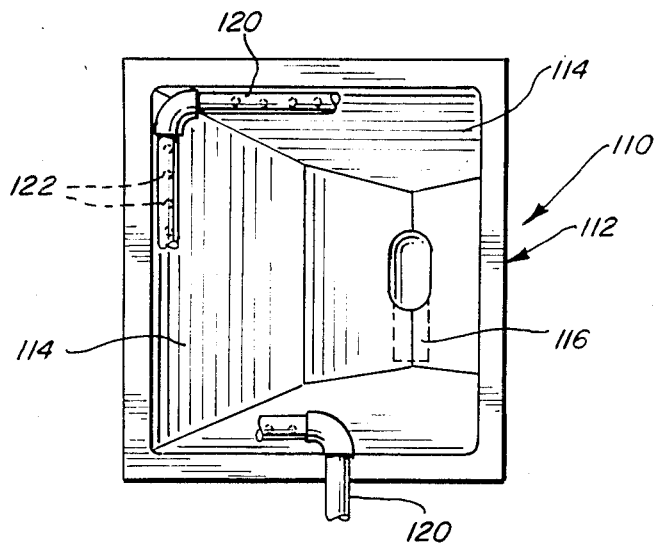
FIG. 5 is an overhead plan view of a portion of the apparatus of FIG. 1, taken generally along line 5—5 thereof.

FIG. 1 illustrates an apparatus, generally designated 10, for rapidly dispersing particles of a dry polymer into water. The apparatus 10 includes air and polymer delivery means, generally designated 12, a chamber, generally designated 14, for contacting polymer particles, air and water, and mechanical dispersion means, generally designated 16.

The air and polymer delivery means 12 includes means (such as an auger, for example) 20 for delivering polymer particles from a source 21 to an inlet conduit 22 which terminates at its lower end 24 at the top of chamber 14. Air is drawn into the conduit 22 through an annular air gap 25, defined by the conduit 22 and the auger outlet.

The chamber 14 illustratively comprises a funnel 30 with a conical wall 31 terminating at its lower end in a frustum 32. The enlarged upper end of the funnel 30 is covered by an annular flange 34 and a cover plate 36 which is secured to the flange 34 and covers the annular central opening 40 thereof. The conduit 22 terminates at an aperture 38 in the cover plate 36.

Figure 2:
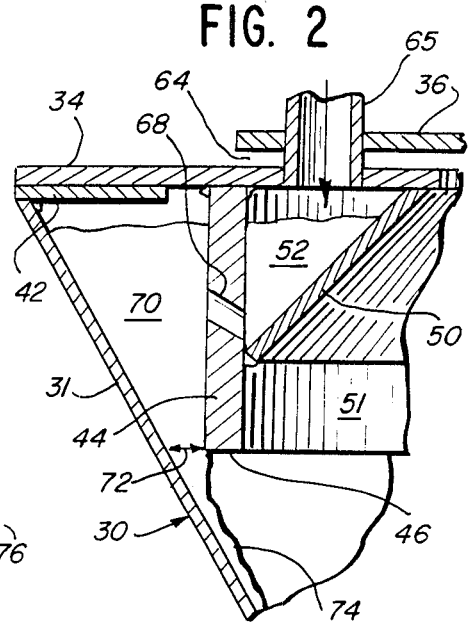
FIG. 2 is a sectional view of a portion of the apparatus of FIG. 1, taken generally along line 2—2 thereof.

The flange 34 rests upon and is sealed against an annular lip 42 of the funnel 30, best seen in FIG. 2.

In the embodiment of the Figures, a cylindrical wall 44 is secured to an extends downwardly from the underside of the flange 34, with its lower end 46 spaced radially inwardly from the funnel wall 31. A frustoconical partition 50 is secured to the inner face 51 of the wall 46 and extends therefrom to the underside of the flange 34 to define an annular chamber 52.

The cover plate 36 is secured to the flange 34 by a plurality of bolts 60, and is spaced from the flange 34 by a plurality of washers 62, thereby defining a space 64 for air flow, described in more detail below. The space 64 is typically on the order of 1/16" in width.

Two water inlet conduits 65 communicate with the chamber 52 through notched openings 66 in the cover plate 36. A plurality of apertures 68 in the wall 44 communicate between the chamber 52 and a chamber 70 defined by the wall 44 and the funnel wall 31. With the introduction of water to the chamber 52 through the conduits 65, the chambers 52 and 70 are flooded. The spacing 72 between the lower edge 46 of the wall 44 and the wall 31 is selected to allow the water in the chamber 70 to define a falling film 74 on the wall 31 which flows downwardly toward the frustum 32 without rotation. Typically, the spacing 72 will be on the order of ⅛" to 3/16" in width.

An overflow catch basin 76 may be mounted about the funnel 30 in order to receive any overflow from the funnel 30. The basin is preferably equipped with a level sensor (not shown) communicating with control means to shut down operation of the apparatus 10 in the event of an overflow.

The frustum 32 of the funnel 30 communicates with a conduit 80 which discharges into the mechanical dispersion means 16. The dispersion means 16 of the Figures includes a boxlike housing 82 having an open bottom side 84, and impeller/stator assembly 86 mounted in the housing 82. The assembly 86 comprises an impeller 90 and a cylindrical stator 92. The impeller 90 is driven for rotation by a motor 94.

Figure 7:
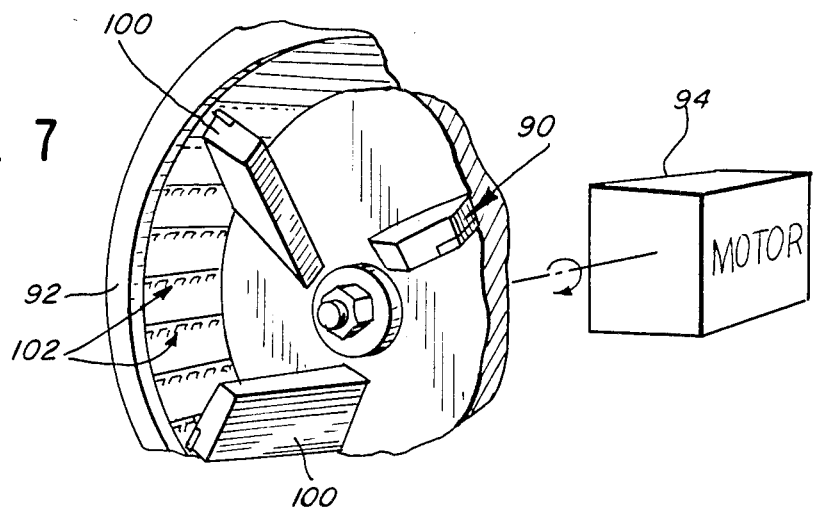
Figure 6:
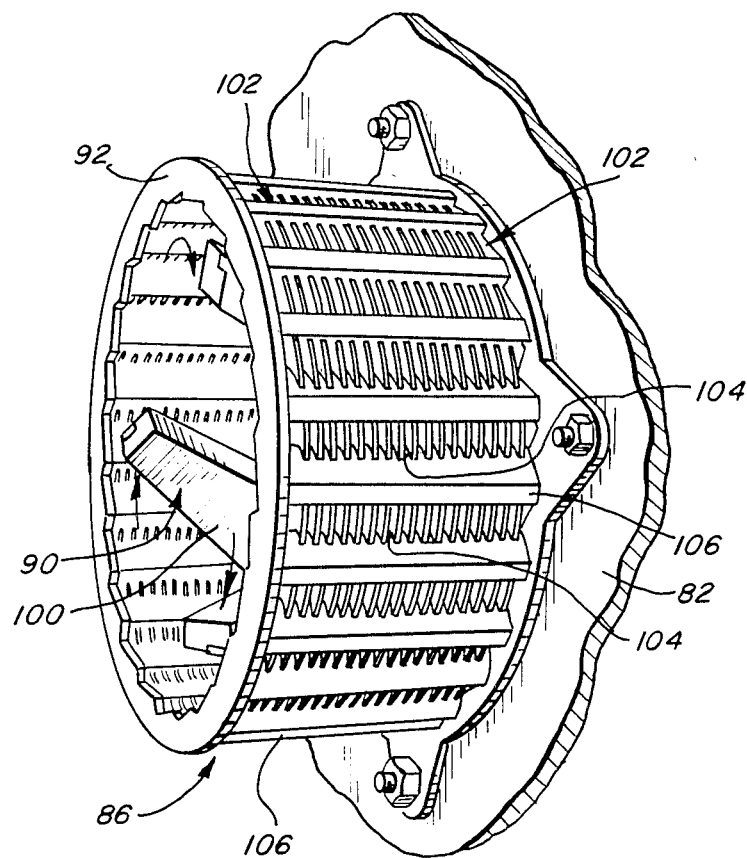
FIG. 6 is a perspective view of a portion of a mechanical dispersion means useful in the invention; and, FIG. 7 is a fragmentary, partially schematic view of the dispersion means of FIG. 6.

Referring to FIGS. 6 and 7, the assembly 86 is described in more detail. The impeller 90 includes a plurality of blades 100. The stator 92 is generally cylindrical in configuration and has a plurality of rows 102 of slots 104 formed in the cylindrical wall. A plurality of guide vanes 106 on the exterior of the stator 92 are angled so as to direct material flowing radially outwardly through the stator 92 away therefrom.

The slots 104 are of a size sufficient to break up agglomerates and enhance wetting of individual polymer particles, yet sufficiently large so as not to result in degradation or size reduction of individual particles.

Referring again to FIG. 1, the mechanical dispersion means 16 discharges into a sump, generally designated 110. The sump 110 comprises a tank 112 having angled side walls 114, with a discharge outlet 116 disposed at the lowermost point thereof.

A conduit 120 connected to a water source (not shown) extends around the upper perimeter of the tank 110. The conduit 120 is provided with holes 122 to provide a flow of water along the walls 114 for flushing thereof.

The sump 110 discharges through the outlet 116 to a positive displacement pump 130 which directs flow through a conduit 132 to a transfer line 134. A water line 140 is connected to the conduit 132 and the transfer line 134 in order to provide flush water to maintain flow of the contents of the transfer line 134.

The operation of the apparatus of the Figures in carrying out the method of the invention is as follows. A flow of water through the conduit 65 is provided in order to at least partially fill the chamber 70 and thus create a falling film 74 on the wall 31 of the funnel 30. The mechanical dispersion means is activated, and the rotating impeller 90 creates a pumping effect to draw the water of the film 74, and particulate polymer and air through the inlet 22 into the interior of the chamber 30. The pumping action of the impeller 90 is sufficient to create a substantial air flow through the air gap 64.

The polymer particles exiting the inlet 22 contact the film 74 at a point spaced somewhat above the frustum 32 of the funnel 30, thus thoroughly wetting the particles with water. It is important that the inlet 22 be positioned off center of the frustum 32 in order to assure thorough contact of the particles with the film 74.

The position of the inlet 22 is selected so that the retention time of particles in the falling film 74 is sufficient to assure thorough wetting of the particles, yet insufficient to result in a substantial degree of dissolution or agglomeration of particles. It is highly preferred that the film 74 falls linearly in the funnel 30, as rotation of the film increases the retention time.

Introduction of air and polymer particles through the inlet 22 will unavoidably result in the production of dust within the chamber 14. This dust is immediately removed through the conduit 80 by the combined action of the air stream flowing through the gap 64 and the pumping action of the impeller 90. The air entering the air gap 64 provides a radially inwardly directed eductive force, away from the wall 31. This assures that polymer dust is quickly directed downwardly toward the frustum 32, thereby avoiding any contact of the dust with dampened (but not wetted) equipment surfaces.

Alternatively, the cover plate 36 may be secured to the flange 34 without the provision of air gaps between the cover plate and the flange, with air gaps extending downwardly through the cover plate. The air gaps may take the form of one or more annular openings surrounding the conduit 22, with concentric, coaxial conduits surrounding the conduit 22. Using this alternative, formation of eddy currents within the chamber 14 is avoided, as the air flow is downwardly, but not radially, directed.

It is also important that the inlet 22 be positioned such that particles exiting therefrom do not contact dampened surfaces but, rather, are directed fully into the film 74 to avoid deposits of wetted polymer.

The volumetric flow rates of water through the conduit 65, and total air through the gap 64 and the inlet 22, are very large in comparison to the volume of the polymer. For example, in an apparatus processing 4–12 lb/min of dry polymer, the flow rate of water through the conduit 65 will typically be in the range of about 15 to 25 gal/min, and the total volumetric flow rate of air entering the chamber 14 will be between about 20 and 30 gal/min.

The large volume of air serves to separate the dry particles from one another as they contact the water in the film 74, thus preventing agglomeration.

As a result, a mixture of water and polymer, with a substantial volume of entrained air, exits through the frustum 32 into the conduit 80 and is directed to the dispersion means 16 at a relatively high velocity. In accordance with the inventive method and apparatus, contact of the water/polymer/air mixture with the disperser 16 is carried out as soon as possible after the mixture is formed, so that the polymer particles do not become sticky. In the impeller/stator assembly 86 of the disperser 16, the mixture of water, polymer and air is subjected to conditions of high shear wherein any existing agglomerates of polymer particles are broken up into individual particles, without substantial size reduction of particles or molecular degradation of individual particles or of any polymer solution thus formed. This is accomplished by the high rate of rotation of the impeller 90 and the action of the slits 104 which are of a size selected to be slightly larger than the diameter of the largest polymer particles.

As a result, a stable dispersion of polymer in water is discharged from the open bottom side 84 of the disperser housing 82 to the sump 110. Water flow from the conduit 120 continuously flushes the walls 114 of the sump. Typically, the water flow rate through the conduit 120 is on the order of only 5 gal/min.

The polymer dispersion and entrained air is pumped from the sump 110 by the pump 130 and directed to the transfer line 134, from where it flows to a user's holding tank or, alternatively, to a mixer which promotes further dissolution of the polymer in the water. Air is separated from the dispersion in the transfer line 134 or in the user's tank or mixer.

The transfer line 134 typically is a conduit with a diameter of about 2 inches. Since relatively long conduits may be used, the polymer in the dispersion may begin to hydrate, thus increasing the viscosity of the material in the transfer line 134. Also, dispersed polymer particles may tend to settle in the line 134. Thus, it is expedient to provide flushing water through the line 140 to maintain the viscosity of the dispersion at a relatively low level and to prevent excessive settling. Typically, the flow rate through the flush line 140 may be on the order of about 20 gal/min.

The concentration of polymer in the dispersion pumped from the sump 120 depends, of course, on the nature of the polymer. In general, however, the method and apparatus of the invention provides very rapid dispersion of relatively high concentrations of polymer. For example, in the case of hydrolyzed polyacrylamide, dispersions containing about 3–25 wt. % or higher (based on water) polymer are readily obtainable. This is attained with absolutely no agglomeration of particles and no dusting of polymer fines. Further, any dust which otherwise would have been created is removed by the system. It will be appreciated by those skilled in the art that the water present in the system effectively scrubs excess air which carries such dust.

The throughput rate of polymer is dependent solely on the size of the apparatus and the corresponding flow rates of air and water.

The illustration in the Figures of specific equipment is not intended to be limiting, as the selection of particular water dispersion means in the chamber 14, the configuration of the chamber 14, the particular hydromechanical dispersing means, etc. will depend on the application and the user's preference. In the exemplary embodiment of the Figures, the dispersion means 16 comprises a size reduction machine typically used in the food processing industry and marketed by Urschel Laboratories, Incorporated of Valparaiso, Indiana under the trademark "Comitrol ® 3600", with an impeller speed of 3600 rpm. The positive displacement pump 130 is a product of the Blackmer Company, and is chosen for its ability to displace greater volumetric flow rates of fluid than fed to the sump 110, thereby assuring removal of the air induced and entrained by the disperser 16. For example, the pump 130 of the Figures is a vane pump transferring 65 gal/min of liquid and air, while about 60 gal/min is provided to the sump.

The foregoing detailed description is given for clearness of understanding only, and no unnecessary limitations should be inferred therefrom, as modifications within the scope of the invention will be obvious to those skilled in the art.

I claim:

1. A method of rapidly dispersing particles of dry, water soluble polymer in water, comprising the steps of:
   (a) contacting said particles with water and air in a chamber under conditions of flow of said air and water such that said particles are substantially completely wetted by said water, without substantial contact by said particles with surfaces of said chamber which are not completely wetted, to form a mixture of water, polymer and entrained air;
   (b) immediately subjecting said mixture to conditions of instantaneous and momentary shear whereby formation of agglomerates of particles is prevented, and existing agglomerates of particles are divided into individual particles without substantial molecular degradation or substantial reduction of particle size, to form a dispersion of said polymer in said water, with entrained air; and,
   (c) separating said dispersion from said air.

2. The method of claim 1 wherein said water is introduced to said chamber as a falling film on the walls of said chamber.

3. The method of claim 2 wherein said particles are introduced directly to said falling film.

4. The method of claim 3 wherein said particles are entrained in a first induced air stream.

5. The method of claim 4 wherein said air is introduced to said chamber in said first air stream and in a second air stream directed to entrain polymer dust.

6. The method of claim 5 wherein said chamber is a vertical frustoconical funnel having means for forming said falling film on the interior conical surfaces thereof.

7. The method of claim 6 wherein an outlet is formed at the frustum of said funnel, and particles are introduced to said chamber entrained in a first air stream directed toward said falling film at a point spaced above and off-center of said frustum.

8. The method of claim 7 wherein a second air stream is introduced to the top of said funnel directed therein so as to create a downwardly directed eductive force.

9. The method of claim 6 wherein said means for forming said falling film comprise a reservoir defined above the inner circumferential surface of the upper end of said funnel, including means for discharging water downwardly from said reservoir onto said surface to form said film without imparting rotational motion to said film.

10. The method of claim 9 wherein said water discharging means comprises discharge holes in said reservoir.

11. The method of claim 9 wherein said water discharging means comprise an annular opening in said reservoir.

12. The method of claim 1 wherein said step (b) is carried out in mechanical dispersion means.

13. The method of claim 12 wherein said dispersion means comprises an impeller and associated means for separating particulate material.

14. A method of rapidly dispersing particles of dry, water soluble polymer in water, comprising the steps of:
   (a) contacting said particles with water and air in a chamber under conditions of flow of said air and water such that said particles are substantially completely wetted by said water, without substantial contact by said particles with surfaces of said chamber which are not completely wetted, to form a mixture of water, polymer and entrained air;
   (b) immediately subjecting said mixture to conditions of instantaneous and momentary shear in mechanical dispersion means whereby formation of agglomerates of particles is prevented, and existing agglomerates of particles are divided into individual particles without substantial molecular degradation or substantial reduction of particle size, to form a dispersion of said polymer in said water, with entrained air, said dispersion means comprising an impeller and associated means for separating particulate material comprising a stator positioned to contact material discharged from said impeller and having openings of a size selected to divide agglomerates of said particles into individual particles without substantially reducing the size or degrading the molecular structure thereof; and,
   (c) separating said dispersion from said air.

15. The method of claim 14 wherein said stator is a slotted cylinder surrounding said impeller.

16. The method of claim 12 wherein said polymer dispersion and said air are discharged from said mechanical dispersion means to means for conveying said dispersion and air to storage means.

17. The method of claim 16 wherein said conveying means comprises a sump, a pump and a transfer conduit.

18. The method of claim 17 wherein said pump is a positive displacement pump.

19. The method of claim 17 wherein said transfer line includes means for flushing said line with additional water.

20. The method of claim 1 wherein said polymer comprises an acrylamide polymer.

21. The method of claim 20 wherein the respective amounts of acrylamide, water and air are selected to provide a polymer dispersion in water comprising between about 3 and 25 wt. % acrylamide polymer.

22. The method of claim 14 wherein said polymer comprises an acrylamide polymer.

23. The method of claim 14 wherein said polymer dispersion and said air are discharged from said mechanical dispersion means to means for conveying said dispersion and air to storage means.

24. The method of claim 14 wherein said water is introduced to said chamber as a falling film on the walls of said chamber.

25. The method of claim 22 wherein the respective amounts of acrylamide, water and air are selected to provide a polymer dispersion in water comprising between about 3 and 25 wt. % acrylamide polymer.

26. The method of claim 23 wherein said conveying means comprises a sump, a pump and a transfer conduit.

27. The method of claim 26 wherein said pump is a positive displacement pump.

28. The method of claim 26 wherein said transfer conduit includes means for flushing said line with additional water.

29. The method of claim 24 wherein said particles are introduced directly to said falling film.

30. The method of claim 29 wherein said particles are entrained in a first induced air stream.

31. The method of claim 30 wherein said air is introduced to said chamber in said first air stream and in a second air stream directed to entrain polymer dust.

32. The method of claim 31 wherein said chamber is a vertical frustoconical funnel having means for forming said falling film on the interior conical surfaces thereof.

33. The method of claim 32 wherein an outlet is formed at the frustum of said funnel, said particles are introduced to said chamber entrained in said first air stream directed toward said falling film at a point spaced above and off-center of said frustum.

34. The method of claim 32 wherein said means for forming said falling film comprise a reservoir defined above the inner circumferential surface of the upper end of said funnel, including means for discharging water downwardly from said reservoir onto said surface to form said film without imparting rotational motion to said film.

35. The method of claim 33 wherein said second air stream is introduced to the top of said funnel directed therein so as to create a downwardly directed eductive force.

36. The method of claim 34 wherein said water discharging means comprises discharge holes in said reservoir.

37. The method of claim 34 wherein said water discharging means comprise an annular opening in said reservoir.

* * * * *